United States Patent [19]

Stepp et al.

[11] Patent Number: 5,670,597
[45] Date of Patent: Sep. 23, 1997

[54] PROCESS FOR THE PREPARATION OF ORGANOPOLYSILOXANES CONTAINING ORGANYLOXY GROUPS

[75] Inventors: Michael Stepp; Stefan Oberneder, both of Burghausen, Germany

[73] Assignee: Wacker-Chemie GmbH, Munich, Germany

[21] Appl. No.: 381,576

[22] Filed: Jan. 31, 1995

[51] Int. Cl.$^6$ .................................................. C08G 77/08
[52] U.S. Cl. ............................. 528/21; 528/14; 528/12; 528/23; 528/16; 528/33; 528/34
[58] Field of Search ............................ 528/21, 14, 12, 528/23, 16, 33, 34

[56] References Cited

U.S. PATENT DOCUMENTS

| | | | |
|---|---|---|---|
| 4,611,040 | 9/1986 | Olson et al. | 526/279 |
| 4,863,992 | 9/1989 | Wengrovius | 524/731 |
| 5,055,502 | 10/1991 | Frances et al. | 524/780 |
| 5,079,324 | 1/1992 | Cocco et al. | 528/14 |
| 5,086,145 | 2/1992 | Morimoto et al. | 528/14 |
| 5,166,296 | 11/1992 | Wengrovius et al. | 524/731 |
| 5,196,497 | 3/1993 | Weber et al. | 528/14 |
| 5,223,595 | 6/1993 | Stepp et al. | 528/14 |
| 5,399,648 | 3/1995 | Yamamoto | 528/12 |

FOREIGN PATENT DOCUMENTS

| | | |
|---|---|---|
| 0304701 | 3/1989 | European Pat. Off. . |
| 0468239 | 1/1992 | European Pat. Off. . |
| 0520718 | 12/1992 | European Pat. Off. . |
| 0540039 | 5/1993 | European Pat. Off. . |
| 0576166 | 12/1993 | European Pat. Off. . |
| 3428840 | 2/1985 | Germany . |
| 2144758 | 3/1985 | United Kingdom . |

OTHER PUBLICATIONS

Clark, J.H., Miller, J.M. in J. Chem. Soc., Perkin Trans. I, 1977, pp. 1743–1745.

Gambacorta, A., Turchetta, S., Botta, M., Synth. Commun., 1989, 19 (1&14), 2441–2448.

Li, C., Lu, Y., Huang, W., He, B., Synth. Commun. 1991, 21(12–13), 1315–1320.

Primary Examiner—Margaret W. Glass

[57] ABSTRACT

A process for the preparation of organopolysiloxanes which contain at least one unit of the formula $$(R^1O)_{3-m}R_mSiO_{1/2} \quad (I)$$

in which

R is identical or different and is a hydrogen atom or monovalent, optionally substituted hydrocarbon radical, $R^1$ is identical or different and is a monovalent, optionally substituted hydrocarbon radical having 1 to 8 carbon atoms and m is 0, 1 or 2, which comprises, in a 1st step, reacting organosilicon compounds (1) which contain at least one Si-bonded hydroxyl group with at least one silane (2) of the formula $$(R^1O)_{4-m}SiR_m \quad (II)$$

and/or partial hydrolysates thereof, in which R, $R^1$ and m have the above mentioned meaning, in the presence of a fluoride salt (3), and, optionally, in a 2nd step, when the reaction has ended, adding component (4) which can bond fluoride ions.

4 Claims, No Drawings

PROCESS FOR THE PREPARATION OF ORGANOPOLYSILOXANES CONTAINING ORGANYLOXY GROUPS

FIELD OF THE INVENTION

The invention relates to a process for the preparation of organopolysiloxanes containing organyloxy groups by reaction of hydroxysiloxanes with organyloxysilanes, and the use thereof in compositions which can be crosslinked at room temperatures.

BACKGROUND OF INVENTION

Processes for the preparation of organopolysiloxanes containing organyloxy groups are already known. For example, U.S. Pat. No. 5,196,497 (Bayer A. G., issued on Mar. 23, 1993) and the corresponding EP 468 239 A2 describe the reaction of α,ω-dihydroxypoly(di-organosiloxanes) with alkoxysilanes in the presence of alkali metal hydroxides, which leads, by elimination of alcohol, to the desired polysiloxanes blocked by end groups. The strong bases have a high equilibrating activity and, if the reaction time is too long or the temperatures relatively high, often lead to an undesirably high content of monoalkoxy end groups which are not capable of crosslinking. Deactivation of the catalyst with strong acids, such as, chlorosilanes or phosphoric acid, must therefore be carried out at precisely the right time. Since the reaction may occur literally within a minute, the time between addition of the catalyst and deactivation of the catalyst of several minutes, customary during factory production, can result in a product which does not meet the specification. Furthermore, the amount of deactivating reagent should be precisely matched stoichiometrically to the amount of catalyst employed, in order to guarantee the storage stability of the end product. In practice, an excess of deactivating reagent will therefore often have to be employed. Since these are strong acids having an equilibrating activity, this excess must be removed from the product again.

U.S. Pat. No. 5,055,502 (Rhone-Poulenc Chemie; issued on Oct. 8, 1991) describes a process in which zinc chelate complexes effect the blocking of the ends of OH polymers with alkoxysilanes at relatively high temperatures. DE 3428840 A1 (General Electric Co.; published on Feb. 21, 1985) and the corresponding GB 2144758 A disclose aluminum chelate complexes which are employed as catalysts for alkoxy blocking of the ends of organopolysiloxanes containing OH groups. In U.S. Pat. No. 5,166,296 (General Electric Co.; issued on Nov. 24, 1992) and the corresponding EP 520 718 A2, the preparation of polysiloxanes blocked by alkoxy end groups from alkoxysilanes and polysiloxanes having terminal OH groups is carried out in the presence of catalytic amounts of ammonium salts of carboxylic acids.

SUMMARY OF INVENTION

The present invention relates to a process for the preparation of organopolysiloxanes which contain at least one unit of the formula $$(R^1O)_{3-m}R_mSiO_{1/2} \quad (I)$$

in which

R is identical or different and is a hydrogen atom or monovalent, optionally substituted hydrocarbon radical, $R^1$ is identical or different and is a monovalent, optionally substituted hydrocarbon radical having 1 to 8 carbon atoms and m is 0, 1 or 2, which comprises, in a 1st step, reacting organosilicon compounds (1) which contain at least one Si-bonded hydroxyl group with at least one silane (2) of the formula $$(R^1O)_{4-m}SiR_m \quad (II)$$

and/or partial hydrolysates thereof, in which R, $R^1$ and m have the above mentioned meaning, in the presence of a fluoride salt (3), and, optionally, in a 2nd step, when the reaction has ended, adding component (4) which can bond fluoride ions.

The term organopolysiloxanes in the context of the present invention is also intended to include oligomeric siloxanes.

The radical R is preferably monovalent, optionally substituted hydrocarbon radicals having 1 to 13 carbon atoms, where the methyl, vinyl and 3-(N-cyclohexylamino)propyl radical are more preferred.

Examples of the radical R are alkyl radicals, such as the methyl, ethyl, n-propyl, iso-propyl, n-butyl, iso-butyl, tert-butyl, n-pentyl, iso-pentyl, neo-pentyl and tert-pentyl radical, hexyl radicals, such as the n-hexyl radical, heptyl radicals, such as the n-heptyl radical, octyl radicals, such as the n-octyl radical, and iso-octyl radicals, such as the 2,2,4-trimethylpentyl radical, nonyl radicals, such as the n-nonyl radical, decyl radicals, such as the n-decyl radical, and dodecyl radicals, such as the n-dodecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl and the naphthyl radical; alkaryl radicals, such as o-, m- and p-tolyl radicals, xylyl radicals and ethylphenyl radicals; and aralkyl radicals, such as the benzyl radical an the α- and β-phenylethyl radical.

Examples of substituted hydrocarbon radicals are haloalkyl radicals, such as the 3,3,3-trifluoro-n-propyl radical, 2,2,2,2',2',2'-hexafluoroisopropyl radical and the heptafluoroisopropyl radical; haloaryl radicals, such as the o-, m- and p-chlorophenyl radical; the 3-thio-1-propyl radical; acyloxyalkyl radicals, such as the acetoxyethyl radical and (meth)acryloyloxypropyl radical; and

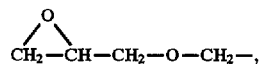

HSCH$_2$—, H$_2$NCH$_2$—, 4,5-dihydroimidazol-1-yl-CH$_2$—, imidazol-1-yl-CH$_2$—, pyrrolidinyl-CH$_2$—, piperidyl-CH$_2$—, N-morpholinyl-CH$_2$—, piperazinyl-CH$_2$—, cyclohexyl-NH—CH$_2$—, H$_2$N—CH$_2$CH$_2$—NH—CH$_2$—, H$_2$C=C(CH$_3$)COO—CH$_2$—, 2-cyanoethyl-, 3-cyanopropyl-,

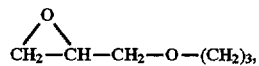

HS(CH$_2$)$_3$—, H$_2$N(CH$_2$)$_3$—, 4,5-dihydroimidazol-1-yl-(CH$_2$)$_3$—, imidazol-1-yl-(CH$_2$)$_3$—, pyrrolidinyl-(CH$_2$)$_3$—, piperidyl-(CH$_2$)$_3$, N-morpholinyl-(CH$_2$)$_3$—, piperazinyl-(CH$_2$)$_3$—, cyclohexyl-NH—(CH$_2$)$_3$—, H$_2$N—CH$_2$—CH$_2$—NH—(CH$_2$)$_3$— and H$_2$C=C(CH$_3$)COO—(CH$_2$)$_3$— radical.

Examples of the radical $R^1$ are the examples of optionally substituted hydrocarbon radicals having 1 to 8 carbon atoms mentioned for R.

The radical $R^1$ is preferably a methyl, ethyl, n-propyl, isopropyl, propen-2-yl, n-butyl, sec-butyl or iso-butyl radical, methyl and ethyl radicals being more preferred.

The organosilicon compounds (1) containing at least one Si-bonded hydroxyl group which are employed in the process according to the invention are preferably those chosen from the group consisting of organopolysiloxanes having at least one Si-bonded hydroxyl group, and organosilanes having a hydroxyl group.

The organosilicon compound (1) containing at least one Si-bonded hydroxyl group which is employed in the process according to the invention can be any of the hydroxysiloxanes and monohydroxysilanes known to date. The hydroxysiloxanes employed according to the invention can of course contain other units containing Si-bonded hydroxyl groups, such as $(HO)_{2-t}R^3_tSiO_{2/2}$ and $HOSiO_{3/2}$ units, in addition to units of the formula $(HO)_{3-s}R^3_sSiO_{1/2}$, in which $R^3$ has one of the meanings given for R, t is 0, 1 or 2 and s is 0 or 1.

Examples of the organosilicon compound (1) employed according to the invention are α,ω-dihydroxydiorganopolysiloxanes, such as $HOMe_2Si(OSiMe_2)_{1 \text{ to } 10000}OH$ and $HOMe_2Si(OSiMe_2)_{0 \text{ to } 10000}(OSiMeVi)_{0 \text{ to } 10000}OH$, where this siloxane contains at least two silicon atoms, α-monohydroxydiorganopolysiloxanes and monohydroxysilanes, such as $Me_3Si(OSiMe_2)_{0 \text{ to } 10000}OH$, $HMe_2Si(OSiMe_2)_{1 \text{ to } 10000}OH$, $(H_2C=CH)Me_2Si(OSiMe_2)_{0 \text{ to } 100000}OH$ and $(H_2C=CHCH_2)Me_2Si(OSiMe_2)_{0 \text{ to } 10000}OH$, where Me is the methyl radical and Vi is the vinyl radical, and branched hydroxy-functional organopolysiloxanes and hydroxy-functional organopolysiloxane resins, such as described in EP 540 039 A1 (Dow Corning Japan Ltd.), column 5, lines 37 to 40 and column 6, line 25, the organyl radicals preferably being methyl radicals. Further examples are organosilicon compounds of the above mentioned type which contain hydroxyl groups and, in addition to methyl groups, also contain phenyl groups, vinyl groups, 1-thio-3-propyl groups or 3,3,3-trifluoropropyl groups.

The hydroxysiloxanes (1) employed according to the invention have a viscosity at 25° C. of preferably 1 to $10^6$ mm²/s, more preferably 10 to $5 \times 10^5$ mm²/s.

The organosilicon compounds (1) employed according to the invention are more preferably α,ω-dihydroxydiorganopolysiloxanes.

The organosilicon compounds which contain hydroxyl groups and are employed according to the invention can be one type of such organosilicon compounds or a mixture of at least two different types of organosilicon compounds.

The organosilicon compounds which contain hydroxyl groups and are employed according to the invention are commercially available products or can be prepared by processes customary in silicone chemistry.

Examples of the silanes (2) employed according to the invention are $Si(OCH_3)_4$, $Si(OCH_2CH_3)_4$, $H_3CSi(OCH_3)_3$, $CH_3Si(OCH_2CH_3)_3$, $H_2C=CH-Si(OCH_3)_3$, $H_2C=CH-Si(OCH_2CH_3)_3$, $C_6H_5-Si(OCH_3)_3$, $(H_3C)_2Si(OCH_3)_2$, $HSi(OCH_2CH_3)_3$, $F_3CCH_2CH_2Si(OCH_3)_3$, $H_2C=CH(CH_2)_4-Si(OCH_3)_3$, $N\equiv C-CH_2CH_2-Si(OR^1)_3$, $N\equiv C-CH_2CH_2CH_2-Si(OR^1)_3$, and $XCH_2CH_2CH_2Si(OR^1)_3$ where X is a

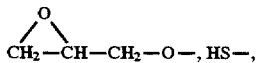

$H_2N-$, 4,5-dihydroimidazol-1-yl-, imidazol-1-yl, pyrrolidinyl-, piperidyl-, N-morpholinyl-, piperazinyl-, cyclohexyl-NH—, $H_2N-CH_2CH_2-NH-$, or $H_2C=C(CH_3)COO-$ radical and $R^1$ has the above mentioned meaning. Some of these silanes also react with OH— functional organosilicon compounds even in the absence of catalysts. In such cases, reaction times can be shortened and/or reaction temperatures lowered by the process according to the invention, which can bring advantages during further processing of the products.

The silanes (2) employed according to the invention are preferably $Si(OCH_3)_4$, $Si(OCH_2CH_3)_4$, $H_3CSi(OCH_3)_3$, $CH_3Si(OCH_2CH_3)_3$, $H_2C=CH-Si(OCH_3)_3$, $H_2C=CH-Si(OCH_2CH_3)_3$, $N\equiv C-CH_2CH_2Si(OCH_2CH_3)_3$, 4,5-dihydroimidazol-1-yl-$CH_2CH_2CH_2Si(OCH_2CH_3)_3$,

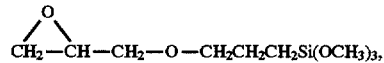

$H_2C=C(CH_3)COOCH_2CH_2CH_2-Si(OCH_3)_3$, cyclohexyl-NH—$CH_2CH_2CH_2-Si(OCH_3)_3$, $H_2N-CH_2CH_2-NH-CH_2CH_2CH_2-Si(OCH_3)_3$, HS—$CH_2CH_2CH_2-Si(OCH_3)_3$ and N-morpholinyl-$CH_2CH_2CH_2-Si(OCH_3)_3$, where $H_3CSi(OCH_3)_3$, $CH_3Si(OCH_2CH_3)_3$, $H_2C=CH-Si(OCH_3)_3$, $H_2C=CH-Si(OCH_2CH_3)_3$, $N\equiv C-CH_2CH_2Si(OCH_2CH_3)_3$, 4,5-dihydroimidazol-1-yl-$CH_2CH_2CH_2Si(OCH_2CH_3)3$ and cyclohexyl-NH—$CH_2CH_2-Si(OCH_3)_3$ are more preferred.

The silanes (2) employed according to the invention can be a single type or a mixture of at least two different types of such silanes or partial hydrolysates thereof.

If partial hydrolysates of the silanes (2) are employed in the process according to the invention, these are preferably those which are liquid at room temperature.

The silanes (2) employed according to the invention or partial hydrolysates thereof are commercially available products or can be prepared by processes customary in silicone chemistry.

The silane (2) and/or partial hydrolysate thereof is advantageously employed in the process according to the invention in a stoichiometric excess with respect to Si-bonded hydroxyl groups.

The silane (2) and/or partial hydrolysate thereof is preferably employed in amounts of 1.01 to 20 mole per mole of Si-bonded hydroxyl groups of the compound (1), more preferably 1.01 to 10 mole per mole of Si-bonded hydroxyl groups of the compound (1). Higher excesses can be favorable if the preparation of compositions based on the organyloxysiloxanes prepared according to the invention which can be crosslinked by moisture at room temperature and in which the excess organyloxysilane serves as the crosslinking agent is desired. Under certain circumstances, a further metering operation thus becomes superfluous, which can have an advantageous effect in particular during continuous preparation of RTV-1 compositions.

The fluoride salt (3) employed in the process according to the invention is preferably one chosen from the group consisting of ammonium fluorides of the formula $$[R^2_4N]F \qquad (III)$$

in which $R^2$ can be identical or different and has one of the meanings given for R, adducts thereof with carbonyl compounds, such as β-ketocarboxylic acid esters of 1,3-diketones, (alkali) metal fluorides, such as potassium fluoride, cesium fluoride, zinc fluoride, dibutyltin fluoride and copper fluoride, and organic or inorganic ammonium hydrogen fluorides, phosphonium fluorides, phosphonium hydrogen fluorides, tetrafluoroborates, hexafluorosilicates and fluorophosphates.

The radical $R^2$ is preferably the methyl, ethyl, n-butyl, n-propyl, iso-propyl or the benzyl radical, where the methyl, n-butyl and benzyl radical are more preferred.

The fluoride salt (3) employed in the process according to the invention is more preferably ammonium fluoride of the formula (III).

Examples of the fluoride salt (3) are [(H$_3$C(CH$_2$)$_3$)$_4$N]F (called TBAF below), [(H$_3$C)$_4$N]F, [C$_6$H$_5$CH$_2$—N(CH$_3$)$_3$]F and [H$_3$CNH$_3$]F and adducts thereof with carbonyl compounds, where acetylacetone, methyl acetoacetate, 2-ethylhexyl acetoacetate and isopropyl acetoacetate are preferred and acetylacetone and ethyl acetoacetate are more preferred as the carbonyl compound.

Fluoride salts are commercially available products or can be prepared by processes customary in organic chemistry. Reference may be made for example to, Clark, J. H., Miller, J. M. in J. Chem. Soc., Perkin Trans. I, 1977, 1743–1745.

The fluoride salts (3) employed according to the invention can be a single type or a mixture of at least two different types of such fluoride salts.

The fluoride salt (3) can be employed in the process according to the invention as a mixture with organic solvents and/or organosilicon compounds or in a form fixed to support materials, such as silicic acid, ion exchanger resin, titanium dioxide or aluminum oxide. Processes for the preparation of fluoride salt bonded to a support material are described, for example, in Gambacorta, A., Turchetta S., Botta, M., Synth. Commun., 1989, 19 (13–14), 2441–2448; Li, C., Lu, Y., Huang, W., He, B., Synth. Commun., 1991, 21(12–13), 1315–1320.

All the known organic solvents which have no interfering effect on the reaction procedure can be employed as solvents; the solvents are preferably organic solvents, which can easily be removed from the end product by evaporation. Examples of such solvents are diethyl ether, dibutyl ether, tetrahydrofuran, dioxane, hexane, toluene, xylenes, chlorobenzene, 1,3-pentanedione, acetone, methyl t-butyl ketone, methyl ethyl ketone, 1,2-dimethoxyethane, acetonitrile, ethyl acetate, methyl acetate, butyl acetate, N,N-dimethylformamide, N,N-dimethylacetamide, dimethyl sulfoxide, methanol, ethanol, n-propanol, 2-propanol, n-butanol, 2-butanol and isobutanol and mixtures of these solvents.

The fluoride salt (3) can also be employed in the process according to the invention as a mixture with organosilicon compounds, such as silanes or oligomeric or polymeric siloxanes.

In the preparation of mixtures which can be crosslinked by moisture at room temperature after the preparation according to the invention of the organyloxysiloxanes in particular it is advantageous to dissolve the fluoride salt (3) in the organyloxysilanes to be reacted, if appropriate with the addition of the corresponding free compound R$^1$OH, where R$^1$ has the above mentioned meaning, or in another liquid constituent, such as OH-containing polysiloxane or a poly(diorganosiloxane) blocked by end groups, which is often employed as plasticizer, such as (H$_3$C)$_3$SiO—[Si(CH$_3$)$_2$O]$_{70}$—Si(CH$_3$)$_3$, an oligomeric siloxane, such as (H$_3$C)$_3$SiOSi(CH$_3$)$_3$, or a cyclosiloxane, such as [Si(CH$_3$)$_2$O]$_4$.

Both the adducts with carbonyl compounds and the ammonium fluorides adsorbed onto support materials often have the advantage that they are less hygroscopic and therefore have a better storage stability than the pure ammonium fluorides.

The fluoride salt (3) is employed in the process according to the invention in amounts of preferably 0.1 to 1000 ppm (parts by weight per million parts by weight), more preferably 1 to 100 ppm, in each case calculated as elemental fluorine and based on the total weight of organosilicon compound (1). The amount of fluoride salt (3) to be employed depends in particular on the reactivity of the individual reaction partners and on the presence of constituents which accelerate or retard the reaction, such as compounds having acid or basic radicals or fluoride-bonding constituents.

The conditions under which the process according to the invention can be carried out primarily depend on the reactivity of the organyloxysilane (2) employed and on the nature and concentration of the fluoride salt (3).

The process according to the invention is carried out at temperatures of preferably 20° to 100° C. under a pressure of preferably 900 to 1100 hPa. However, it can also be carried out at higher or lower temperatures and under higher or lower pressures.

In most cases, the process according to the invention can be carried out at room temperature. However, it may be advantageous, for example, if a lower viscosity of the reaction mixture is required for technical reasons, to carry out the reaction at elevated temperature; in this case acceleration of the reaction is in general to be expected under otherwise the same conditions.

The end of the reaction according to the invention can be detected by measuring the SiOH content in the reaction mixture by means of IR spectroscopy, $^{29}$Si-NMR or $^1$H-NMR spectroscopy or by a crosslinking test to detect residual SiOH functions in polysiloxanes, such as by the crosslinking test according to EP 468 239 A2 cited above, or by addition of aluminum tri-sec-butylate; an immediate increase in viscosity, under certain circumstances up to gelling, indicates residual SiOH groups and therefore incomplete conversion.

When the reaction according to the invention has ended, the fluoride salt (3) is preferably deactivated by addition of component (4), which can bond fluoride ions, the aim being to suppress further unwanted reactions and to ensure that the organopolysiloxanes which contain organyloxy groups and are prepared according to the invention do not change during storage.

Examples of component (4) are aluminum compounds and complexes, such as aluminum alcoholates, pyrogenically produced or precipitated silicic acid, calcium-containing fillers, which are suitable for deactivation of component (3) because of the high tendency towards formation of calcium fluoride, such as calcium carbonate, calcium silicate, calcium phosphate and chalks whose surface has been treated with carboxylic acids such as 2-ethylhexanoic acid (so-called coated chalks), and mixtures thereof.

Aluminum compounds or complexes are preferably employed as component (4) in the process according to the invention.

Examples of compounds and complexes of aluminum are aluminum carboxylates, aluminum thiolates, aluminum sulfonates, aluminum phosphonates, aluminum amides, aluminum sil(ox)anolates, aluminum halides, aluminum alcoholates and aluminum alcoholates in which one or more alkoxy radicals can be replaced by β-dicarbonyl chelating ligands, for example Al[OCH$_2$CH$_3$]$_3$, Al[OCH(CH$_3$)(C$_2$H$_5$)]$_3$, Al[OCH(CH$_3$)$_2$]$_3$, Al[H$_3$C—C(O)CHC(O)—CH$_3$]$_3$, Al[OCH(CH$_3$)$_2$]$_2$[H$_3$CC(O)CHCOOCH$_2$CH$_3$], aluminum complexes according to formula (4) of DE 34 28 840 A1 cited above, such as aluminum di(methoxy) ethylacetoacetonate, aluminum methoxy-di (ethylacetoacetonate), aluminum di(isopropoxy) acetylacetonate, aluminum isopropoxy-di(acetylacetonate), aluminum isopropoxy-di(ethylacetoacetonate), aluminum bis(trimethylsiloxy)ethylacetoacetonate, aluminum bis(dimethoxymethylsiloxy)ethylacetoacetonate, aluminum bis(dimethoxymethylsiloxy)acetylacetonate, aluminum tri(ethylacetoacetonate), aluminum bis(dimethylamino)ethylacetoacetonate, aluminum 1,3-propanedioxyethylacetoacetonate and aluminum di(isopropoxy)(methylsalicylate), and reaction products of aluminum alcoholates and organyloxysilanes of the formula (II), such as di-sec-butoxyaluminoxytriethoxysilane and the reaction product of aluminum di(isopropoxy)-ethylacetoacetonate and tetraethoxysilane.

An aluminum alcoholate is more preferably employed as component (4) in the process according to the invention.

Component (4) employed according to the invention can be a single type or a mixture of at least two different types of such components (4).

The aluminum compounds and complexes employed as component (4) are commercially available products or can be prepared by processes customary in chemistry.

The aluminum compound or complex (4) can be employed in the process according to the invention as a mixture with organic solvents and/or organosilicon compounds, which is preferred.

Solvents and organosilicon compounds which can be employed are the same as those which were described above in connection with the fluoride salt (3), the aluminum compound or complex (4) preferably being employed as a mixture with tetrahydrofuran and/or polydiorganosiloxanes, such as $(H_3C)_3SiO[Si(CH_3)_2O]_{70}$—$Si(CH_3)_3$, $(H_3C)_3SiOSi(CH_3)_3$ and $[Si(CH_3)_2O]_4$.

At least a stoichiometric equivalent of aluminum in the form of the aluminum compound or complex (4) with respect to the fluoride is preferably added in the deactivation step according to the invention. The aluminum compound or complex (4) is more preferably employed in amounts of 1.05 to 3 mole of aluminum per mole of fluoride of component (3).

The process according to the invention can be carried out continuously or discontinuously.

The elimination of the organopolysiloxanes according to the invention containing organyloxy groups after the reaction according to the invention or after the deactivation step according to the invention can be carried out by any desired and known methods. For example, after the deactivation step according to the invention, the excess organyloxysilane (2), the compound $R^1OH$ liberated as a cleavage product, where $R^1$ has the above mentioned meaning, and other possible cleavage products and solvents can be removed by thorough heating and/or by reducing the pressure.

The organopolysiloxanes which contain organyloxy groups and are prepared according to the invention can be employed for all purposes for which organopolysiloxanes having organyloxy groups have also been employed such as, for coatings to improve the water-repellent properties of substrate surfaces, as an adhesion promoter additive, as a primer, for adhesives, for textile coatings, for plasticizers (which can be crosslinked in if the siloxane is blocked by organyloxy at only one end) and as a base polymer in organopolysiloxane compositions which can be cross-linked by moisture, in particular RTV-1 compositions.

Organopolysiloxane compositions which can be cross-linked by moisture and processes for their preparation are generally known. They essentially comprise base polymer, vulcanization catalysts, crosslinking agents and, optionally, plasticizers (in general silicone oils which are blocked with non-reactive end groups), fillers, adhesion promoters and stabilizers.

For certain intended uses of the organopolysiloxanes which contain organyloxy groups and are prepared according to the invention, in particular for their use in compositions which crosslink by means of moisture, the reaction composition obtained according to the invention can be employed without elimination of the organopolysiloxane which contains organyl groups. In this case, an excess of the silane (2) employed in the process according to the invention can serve as the crosslinking agent. If pyrogenic silicic acid is employed as a constituent, the amount of aluminum compound can be greatly reduced proportionally, or its use can be dispensed with entirely, because of the high adsorptive bonding of fluoride ions onto the silicic acid surface.

It is essential, for the stability of the compositions which can be cross-linked by means of moisture, only that complete reaction of the hydroxyl groups of the organosilicon compound (1) with the organyloxysilane (2) has taken place before addition of the pyrogenic silicic acid. This applies to calcium-containing fillers or additives, which are suitable for the deactivation because of the high tendency toward the formation of calcium fluoride.

If use of the polysiloxanes prepared by the process according to the invention in organopolysiloxane compositions which cure by means of moisture is intended, the process according to the invention can also be carried out as a one-pot process or continuously in the mixing unit envisaged for preparation of the compositions which crosslink by means of moisture. In the latter case, the fluoride salts (3) and the deactivating reagents (4) can be combined with the reaction medium in static mixer systems with the aid of metering pumps.

The process according to the invention has the advantage that organopolysiloxanes containing organyloxy groups can be prepared in a simple manner and selectively with a high rate of reaction.

The fluoride component (3) employed according to the invention has the advantage that it has a highly accelerating action on the reaction according to the invention and has only a moderate equilibrating activity.

If component (4) is added, there is a further advantage in that by the deactivation step with aluminum alcoholates carried out according to the invention, storage-stable end products are accessible without an after-treatment step, even if the deactivating aluminum compound is employed in a small stoichiometric excess.

In the examples described below, all parts and percentage data relate to the weight, unless stated otherwise. Furthermore, all the viscosity data relate to a temperature of 25° C. Unless stated otherwise, the following examples were carried out under a pressure of the surrounding atmosphere at about 1000 hPa and at room temperature at about 20° C., or a temperature which is established when the reactants are brought together at room temperature without additional heating or cooling.

TBAF represents tetra-n-butylammonium fluoride

THF represents tetrahydrofuran

EXAMPLE 1

A Preparation of the aluminum component

A mixture of 27.6 g of water and 230 g of THF is added to a solution of 210 g of aluminum di(isopropoxy)-acetoacetic ester chelate ($=Al[O-CH(CH_3)_2]_2[H_3C-C(O)CHC(O)OC_2H_5]$) and 319 g of tetraethoxysilane in 766 g of THF at room temperature in the course of 30 minutes. The mixture was then heated under reflux for one hour. Thereafter, all the volatile constituents were stripped off at room temperature under 3 hPa. After filtration, 344 g of a clear oily liquid, the aluminum content of which was 3.9% by weight, were obtained.

A mixture of 2000 g of a polydimethylsiloxane having OH end groups and a viscosity of 1000 mm2/s with 145 g of methyltrimethoxysilane was prepared in a planetary mixer. 4.3 ml of 1.1M solution of TBAF in THF were stirred into this mixture (=0.0047 mole of F; 45 ppm of F, based on the weight of hydroxysiloxane). After 25 minutes, 7.74 g of a solution of 3.87 g of the aluminum component described under A) in 3.87 g of methyltrimethoxysilane were added (=0.0056 mole of Al). After the components had been mixed thoroughly for 5 minutes, a $^{29}$Si-NMR spectrum and a gel permeation chromatogram of the reaction mixture were recorded. It was found that all the OH end groups had been replaced by $H_3CSi(OCH_3)_2$—O— end groups. Gel permeation chromatography showed a molecular size distribution (excluding the excess methyltrimethoxysilane) which corresponded to that of the OH group-containing polymer employed.

EXAMPLE 2

1.3 ml of 1.1M solution of TBAF in THF were added to a mixture of 150 g of polydimethylsiloxane having OH end groups and a viscosity of 70 mm$^2$/s and 48.96 g of methyltrimethoxysilane (0.0014 mole of F, 181 ppm of F, based on the weight of hydroxysiloxane). After 20 minutes, the catalyst was deactivated by addition of 2.6 ml of a 50% strength solution of the aluminum component described in Example 1 under A) in methyltrimethoxysilane (0.0019 mole of Al). The volatile constituents were then distilled off up to 80° C./12 hPa. 155 g of a clear colorless oil remained as the residue, the average formula of which was obtained from the $^{29}$Si-NMR spectrum: MeSi(OMe)$_2$—(SiMe$_2$O)$_{44}$—Si(OMe)$_2$Me.

Comparison Example 1

0.55 ml of a 10% strength solution of aluminum tri-secbutylate in THF was added to a mixture of 100 g of a polydimethylsiloxane having OH end groups and a viscosity of 1000 mm$^2$/s and 14.8 g of methyltrimethoxysilane, after which the formation of gelatinous regions occurred suddenly, which is to be interpreted as an indication of incomplete saturation of the Si—OH groups of the polydimethylsiloxane having OH end groups. In addition to methyltrimethoxysilane and the dimethylsiloxy units of the OH-polymer, only HO—Si(CH$_3$)$_2$—O— and no H$_3$CSi(OCH$_3$)$_2$—O— end groups were detectable in the $^{29}$Si-NMR spectrum.

EXAMPLE 3

A mixture of 2000 g of a polydimethylsiloxane having OH end groups and a viscosity of 1000 mm$^2$/s with 145 g of methyltrimethoxysilane was prepared in a planetary mixer. 4.3 ml of a 1.1M solution of TBAF in THF were stirred into this mixture (=0.0047 mole of F; 45 ppm of F, based on the weight of hydroxysiloxane). After storage at 25° C. for two days, products of polymer degradation reactions (equilibration) were detected from the $^{29}$Si-NMR spectrum: the content of monomethoxy end groups, which are not capable of crosslinking, was 20 mole %, based on all the end groups (80 mole of H$_3$CSi(OCH$_3$)$_2$ end groups); the chain lengthening content of Si(CH$_3$)OCH$_3$-groups incorporated, was the same size. Dimethyldimethoxysilane was also detectable.

EXAMPLE 4

B Preparation of catalyst solution F 150 ml of 4% strength hydrofluoric acid were added to 195 ml of a 40% strength aqueous solution of tetra-n-butylammonium hydroxide. The pH of the solution was 7. After addition of 60 g of 2,5-pentanedione, all the volatile constituents were distilled off on a rotary evaporator at 40° C./1 hPa. 5.5 g of the solid residue were dissolved in 30 ml of methyltrimethoxysilane. A clear red-brown solution having a fluoride content of 0.014 g/ml was obtained.

0.1 ml of the catalyst solution F described above under (B) was added to a mixture of 100 g of polydimethylsiloxane having OH end groups and a viscosity of 1000 mm$^2$/s and 7.4 g of methyltrimethoxysilane (=0.000074 mole of F; 14 ppm of F, based on the weight of hydroxysiloxane) and the mixture was stirred for 20 minutes. The catalyst was deactivated by addition of 0.55 ml of a 10% strength solution of aluminum tri-sec-butylate in THF (0.000223 mole of Al). As a crosslinking test showed (addition of aluminum tri-sec-butylate to small samples taken from the reaction mixture after certain intervals of time), all the SiOH groups had reacted in the desired sense after only 15 minutes (no further gelling with aluminum tri-sec-butylate). It was to be seen from the $^{29}$Si-NMR spectrum that all the OH end groups had been converted into H$_3$CSi(OCH$_3$)$_2$— end groups.

EXAMPLE 5

The procedure described in Example 4 was repeated with the modification that, instead of 0.1 ml, 0.2 ml of catalyst solution F (=0.000147 mole of F; 28 ppm of F, based on the weight of hydroxysiloxane) was added. From the crosslinking test for residual SiOH, it was found that the reaction had already ended after 10 minutes. Nevertheless, deactivation with the aluminum component was carried out only after 20 minutes. The $^{29}$Si-NMR spectrum was identical to that from Example 4.

EXAMPLE 6

The procedure described in Example 4 was repeated, with the modification that instead of 0.1 ml, 0.3 ml of catalyst solution F (=0.00022 mole of F; 42 ppm of F, based on the weight of hydroxysiloxane) was added. It was found from the crosslinking test for residual SiOH that the reaction had already ended after 5 minutes. Nevertheless, deactivation with the aluminum component was carried out only after 20 minutes. The $^{29}$Si-NMR spectrum was identical to that from Example 4.

The $^{29}$Si-NMR spectrum of a sample which had been subjected to storage under heat in a closed polyethylene bottle in a drying cabinet at 80° C. for 7 days, showed no change compared with the starting spectrum.

EXAMPLE 7

The procedure described in Example 5 was repeated, with the modification that instead of 0.2 ml of catalyst solution F as described in Example 4 under B), 0.2 ml of a 1.1M TBAF solution in THF (0.00022 mole of F) was added. After 20 minutes, deactivation was carried out with 1.1 ml of a 10% strength solution of aluminum tri-sec-butylate in THF (0.00045 mole of Al). The $^{29}$Si-NMR spectrum was identical to that of Example 5.

The $^{29}$Si-NMR spectrum of a sample which had been subjected to storage under heat in a closed polyethylene bottle in a drying cabinet at 80° C. for 7 days showed no change compared with the initial spectrum.

EXAMPLE 8

The procedure described in Example 7 was repeated, with the modification that after 20 minutes the deactivation was carried out with 2.2 ml instead of 1.1 ml of a 10% strength solution of aluminum tri-sec-butylate (0.00089 mole of Al). The $^{29}$Si-NMR spectrum was identical to that of Example 5.

The $^{29}$Si-NMR spectrum of a sample which had been subjected to storage under heat in a closed PE bottle in a drying cabinet at 80° C. for 7 days showed no change compared with the starting spectrum.

Comparison Example 2

A mixture of 0.2 ml of a 1.1M solution of TBAF in THF (0.00022 mole of F) and 0.6 ml of a 10% strength solution of aluminum tri-sec-butylate in THF (0.00024 mole of Al) was added to a mixture of 100 g of a polydimethylsiloxane having OH end groups and a viscosity of 1000 mm$^2$/s and 10 g of methyltrimethoxysilane. It was found from the $^{29}$Si-NMR spectrum of the reaction mixture that no reaction had taken place.

EXAMPLE 9

0.2 ml of a 1.0M solution of TBAF in THF was added to a mixture of 100 g of a polydimethylsiloxane having OH end groups and a viscosity of 1000 mm$^2$/s and 12.7 g of 3-glycidoxypropyl-trimethoxysilane (H$_2$C(O)CHCH$_2$O (CH$_2$)$_3$—Si(OCH$_3$)$_3$ (0.0002 mole of F, 38 ppm of F, based on the weight of hydroxysiloxane). After 45 minutes, deactivation was carried out with 0.55 ml of a 10% strength solution of aluminum trisec-butylate in THF (0.00022 mole of Al). It was found in the $^{29}$Si-NMR spectrum of the mixture that all the SiOH functions had been converted into Si—OSi(OCH$_3$)$_2$—(CH$_2$)$_3$—OCH$_2$—CH(O)CH$_2$. The excess silane employed could be removed by thorough heating at 110° C./0.1 hPa on a thin film evaporator.

EXAMPLE 10

0.2 ml of a 1.0M solution of TBAF in THF was added to a mixture of 100 g of a polydimethylsiloxane having OH end groups and a viscosity of 1000 mm$^2$/s and 13.4 g of 3-methacryloyloxypropyl-trimethoxysilane (H$_2$C=C(CH$_3$) COO(CH$_2$)$_3$—Si(OCH$_3$)$_3$) (0.0002 mole of F, 38 ppm of F, based on the weight of hydroxysiloxane). After 25 minutes, deactivation was carried out with 0.55 ml of a 10% strength solution of aluminum tri-sec-butylate in THF (0.00022 mole of Al). It was found in the $^{29}$Si-NMR spectrum of the mixture that all the SiOH functions had been converted into Si—OSi(OCH$_3$)$_2$—(CH$_2$)$_3$—OOC(CH$_3$)C=CH$_2$. The excess silane employed could be removed by thorough heating at 110° C./0.1 hPa on a thin film evaporator.

EXAMPLE 11

0.2 ml of a 1.1M solution of TBAF in THF was added to a mixture of 100 g of a polydimethylsiloxane having OH end groups and a viscosity of 1000 mm$^2$/s and 14.2 g of 3-(N-cyclohexylamino)propyl-trimethoxysilane (cyclohexyl-HN—(CH$_2$)$_3$—Si(OCH$_3$)$_3$) (0.00022 mole of F, 42 ppm of F, based on the weight of hydroxysiloxane). After 15 minutes, deactivation was carried out with 0.22 g of the aluminum component described in Example 1 under A) (0.0003 mole of Al). It was found in the $^{29}$Si-NMR spectrum of the mixture that all the SiOH functions had been converted into Si—OSi(OCH$_3$)$_2$—(CH$_2$)$_3$—NH(cyclohexyl).

EXAMPLE 12

0.2 ml of a 1.0M solution of TBAF in THF was added to a mixture of 100 g of a polydimethylsiloxane having OH groups and a viscosity of 1000 mm$^2$/s and 8.9 g of triethoxysilane (0.0002 mole of F, 38 ppm of F, based on the weight of hydroxysiloxane). After 15 minutes, deactivation was carried out with 0.55 ml of a 10% strength solution of aluminum trisec-butylate in THF (0.00022 mole of Al). It was found in the $^{29}$Si-NMR spectrum of the mixture that all the SiOH functions had been converted into Si—OSiH (OCH$_2$CH$_3$)$_2$.

EXAMPLE 13

0.2 ml of a 1.0M solution of TBAF in THF was added to a mixture of 100 g of a polydimethylsiloxane having OH end groups and a viscosity of 1000 mm$^2$/s and 6.5 g of dimethyldimethoxysilane (=0.0002 mole of F, 38 ppm of F, based on the weight of hydroxysiloxane). After 15 minutes, deactivation was carried out with 0.55 ml of a 10% strength solution of aluminum tri-sec-butylate in THF (0.00022 mole of Al). It was found in the $^{29}$Si-NMR spectrum of the mixture that all the SiOH functions had been converted into Si—OSi(CH$_3$)$_2$OCH$_3$.

EXAMPLE 14

1 ml of a 1.0M solution of TBAF in THF was added to a mixture of 50 g of a branched polydimethylsiloxane having OH end groups and the average composition [HOSi(CH$_3$)$_2$O$_{1/2}$]$_4$—[Si(CH$_3$)$_2$O]$_{52}$[SiO$_2$]$_{1.2}$ (prepared by gentle hydrolysis of a reaction product, prepared in the presence of PNCl$_2$, SiCl$_4$ and a polydimethylsiloxane having OH end groups and a viscosity of 5 Pas) and 35.4 g of methyltrimethoxysilane (=0.001 mole of F, 380 ppm of F, based on the weight of hydroxysiloxane). After 10 minutes, deactivation was carried out with 2.7 ml of a 10% strength solution of aluminum tri-sec-butylate in THF (0.001 mole of Al). It was found in the $^{29}$Si-NMR spectrum of the mixture that all the SiOH functions had been converted into Si—OSi(CH$_3$)$_2$CH$_3$.

EXAMPLE 15

0.2 ml of a 1.0M solution of TBAF in THF was added to a mixture of 100 g of a polydimethylsiloxane having OH end groups and a viscosity of 1000 mm$^2$/s and 7.4 g of methyltrimethoxysilane at 75° C. (=0.0002 mole of F, 42 ppm of F, based on the weight of hydroxysiloxane). After 4 minutes, crosslinking test on SiOH (aluminum sec-butylate) indicated complete conversion. Deactivation was subsequently carried out with 0.55 ml of a 10% strength solution of aluminum tri-sec-butylate in THF (0.00022 mole of Al). It was found in the $^{29}$Si-NMR spectrum of the mixture that all the SiOH functions had been converted into Si—OSi(OCH$_3$)$_2$CH$_3$.

Comparison Example 3

2 g of a solution of 2 g of NaOH in 47.5 g of tetraethoxysilane and 0.5 g of ethanol (=0.002 mole of NaOH) were added to a mixture of 163 g of a polydimethylsiloxane having OH end groups and a viscosity of 1000 mm$^2$/s and 24.5 g of tetraethoxysilane. After 15 minutes, the base was neutralized with 0.2 g of dimethyldichlorosilane (=0.0031 mole of Cl). All of the volatile components were subsequently stripped off at 50° C./2 hPa. It was found in the $^{29}$Si-NMR spectrum of the mixture, recorded after three days, that all the SiOH functions had been converted into Si—OSi(OCH$_2$CH$_3$)$_3$.

Comparison Example 4

Comparison Example 3 was repeated, with the difference that the volatile constituents were not distilled off after the neutralization. It was found in the $^{29}$Si-NMR spectrum of the mixture recorded after three days that the desired triethoxysilyl end groups were present only in traces, and instead Si—OSi(CH$_3$)$_2$(OCH$_2$CH$_3$) functions which were not capable of crosslinking were chiefly detectable.

EXAMPLE 16

A mixture of 90.9 g of methyltrimethoxysilane and 2.7 ml of a 1.1M solution of TBAF in THF was added to 1000 g of a polydimethylsiloxane having OH end groups and a viscosity of 80 Pas (=0.003 mole of F, 56 ppm of F, based on the weight of hydroxysiloxane) in a planetary mixer. The mixture was stirred at room temperature for 25 minutes before deactivation was carried out with 24.3 g of a 10% strength solution of aluminum tri-sec-butylate in a poly (dimethylsiloxane) blocked by trimethylsilyl end groups (=0.01 mole of Al) which had a viscosity of 100 mm$^2$/s. 524 g of this polydimethylsiloxane having trimethylsilyl end groups, 72.7 g of hexamethyldisilazane, 254.4 g of a hydrophobic, pyrogenic silicic acid having a specific surface area of 120 m$^2$/g and 4.91 g of dibutyltin diacetate were then mixed in succession. Half of the paste obtained was cured in air in a layer thickness of 2 mm at room temperature for 14 days. An elastic vulcanizate which gave the following mechanical values was obtained:

Tear strength (DIN 53504): 0.9 N/mm$^2$
Elongation at break (DIN 53504): 340%
Tensile stress at 100% elongation (DIN 53504): 0.2 N/mm$^2$
Tear propagation resistance (ASTM D 624 B-91): 4.3 N/mm$^2$
Hardness (Shore A) (DIN 53505): 17

To investigate the storage stability, the other half of the paste was protected from access of atmospheric humidity in polyethylene cartridges. After storage at 50° C. for 3 weeks, the paste showed no crosslinking phenomena when spread out, but then cured to an elastomer under the influence of atmospheric moisture.

Comparison Example 5

(analogous to Example 1 of EP 468239 A2 cited above)

0.9 g of a solution of 2 g of NaOH in 47.5 g of methyltrimethoxysilane and 0.5 g of methanol (=0.0009 mole of NaOH) was added to a mixture of 145 g of a polydimethylsiloxane having OH end groups and a viscosity of 1000 mm$^2$/s (about 0.0178 mole of OH) and 10 g of methyltrimethoxysilane (0.0735 mole). After 5 minutes, the base was neutralized with 0.73 g of a solution of 5 g of dimethyldichlorosilane in 45 g of hexamethyldisiloxane (=0.0011 mole of Cl). The mixture was then heated thoroughly at 140° C./25 hPa for 2 hours. 132 g of a cloudy oil having a viscosity of 979 mm$^2$/s remained as the residue. The following average formula was obtained from the $^{29}$Si-NMR spectrum of the product:

[MeSi(OMe)$_2$O$_{1/2}$]$_2$[SiMe$_2$O]$_{220}$. Blocking of the SiOH end groups was complete.

Comparison Example 6

The procedure described in Comparison Example 5 was repeated, with the modification that the base was neutralized only after 10 minutes. 138 g of a cloudy oil having a viscosity of 427 mm$^2$/s were obtained as the end product. The following average formula was obtained from the $^{29}$Si-NMR spectrum of the product:

[MeOSiMe$_2$O$_{1/2}$]$_2$[Me(MeO)SiO][MeSiO$_{3/2}$]$_{0.5}$ [SiMe$_2$O]$_{110}$. Although the blocking of SiOH end groups was complete, rearrangements to an extent such that the desired MeSi(OMe)$_2$ end group was present only in traces had already taken place by lengthening the reaction time by 5 minutes compared with Comparison Example 5.

EXAMPLE 17

C Preparation of catalyst solution F1

60 ml of 25% strength sulfuric acid were added to a solution of 17.4 g of potassium fluoride in 30 ml of completely demineralized water. After 30 minutes neutralization was carried out with 180 ml of an approximately 40% strength aqueous solution of tetra-n-butylammonium hydroxide. The mixture was then extracted with 200 ml of THF. The extract was concentrated to dryness on a rotary evaporator and the residue was taken up in 300 ml of methyltrimethoxysilane. Volatile constituents were then stripped off at 25° C./10 hPa. The mixture was filtered. 192 g of a colorless, clear liquid having a fluoride content of 0.6 mole/l were obtained.

The advantage of this procedure lies in the fact that the hygroscopic tetrabutylammonium fluoride is practically dried with methyltrimethoxysilane. In the presence of the fluoride the residual moisture led to hydrolysis or condensation of the methyltrimethoxysilane. Liquid oligomers of methyltrimethoxysilane and an insoluble precipitate of methylsilicic acid, which can be removed by simple filtration, are formed.

0.2 ml of catalyst solution F1 described above under (C) was added to a mixture of 100 g of a polydimethylsiloxane having OH end groups and a viscosity of 1000 mm$^2$/s and 7.4 g of methyltrimethoxysilane (=23 ppm of F, based on the weight of hydroxysiloxane) and the mixture was stirred for 20 minutes. The catalyst was deactivated by addition of 0.7 ml of a 10% strength solution of aluminum tri-sec-butylate in hexamethyldisiloxane. As a crosslinking test showed (addition of aluminum tri-sec-butylate to small samples of the reaction mixture taken after certain intervals of time), all the SiOH groups had reacted in the desired sense after only 10 minutes (no further gelling with aluminum tri-sec-butylate). It was to be seen from the $^{29}$Si-NMR spectrum that all the OH end groups had been converted into H$_3$CSi (OCH$_3$)$_2$— end groups.

EXAMPLE 18

The procedure described in Example 17 was repeated, with the modification that 0.2 ml of catalyst solution F1 prepared in Example 17 under (C) (=23 ppm of F, based on the weight of hydroxysiloxane) which had been stored at a temperature of 70° C. in a polyethylene bottle for a period of 7 days was employed. As a crosslinking test showed (addition of aluminum tri-sec-butylate to small samples taken from the reaction mixture after certain intervals of time), all the SiOH groups had reacted in the desired sense after only 10 minutes (no further gelling with aluminum tri-sec-butylate). It was to be seen from the $^{29}$Si-NMR spectrum that all the OH end groups had been converted into H$_3$CSi(OCH$_3$)$_2$— end groups.

EXAMPLE 19

0.2 ml of a 1.0M solution of TBAF in THF was added to a mixture of 100 g of a polydimethylsiloxane having OH end groups and a viscosity of 1000 mm$^2$/s and 11.7 g of 2-cyanoethyltriethoxysilane (0.0002 mole of F, 38 ppm of F, based on the weight of hydroxysiloxane). As a crosslinking test showed (addition of aluminum tri-sec-butylate to small samples taken from the reaction mixture after certain intervals of time), all the SiOH groups had reacted in the desired sense after only 10 minutes (no further gelling with aluminum tri-sec-butylate). After this period of time, deactivation was carried out with 0.65 ml of a 10% strength solution of aluminum tri-sec-butylate in hexamethyldisiloxane (0.00026 mole of Al). It was found in the $^{29}$Si-NMR spectrum of the mixture that all the SiOH functions had been converted into Si—O—Si(OCH$_2$CH$_3$)$_2$—(CH$_2$)$_2$—C≡N and the ratio of end groups/dimethylsiloxy units had not changed compared with the starting value. The $^{29}$Si-NMR spectrum of a sample which had been subjected to storage under heat at 70° C. in a closed polyethylene bottle for 7 days showed no formation of monoethoxy end groups and/or branchings.

EXAMPLE 20

0.1 ml of catalyst solution F1 described in Example 17 under C) was added to a mixture of 100 g of a polydimethylsiloxane having OH end groups and a viscosity of 1000 mm$^2$/s and 15.0 g of N-[(3-triethoxysilyl)-propyl]-4,5-dihydroimidazole (commercially obtainable under the name "Dynasilan IMEO" from Hüls AG, Marl) (0.00006 mole of F, 11 ppm of F, based on the weight of hydroxysiloxane). Since no further gelling on samples taken occurred in the crosslinking test according to Example 19 with aluminum tri-sec-butylate after 20 minutes, deactivation was carried out after this period of time with 0.16 ml of a 10% strength solution of aluminum tri-sec-butylate in hexamethyldisiloxane (0.000065 mole of Al). It was found in the $^{29}$Si-NMR spectrum of the mixture that all the SiOH functions had been converted into Si—OSi(OCH$_2$CH$_3$)$_2$—(CH$_2$)$_3$—N-dihydroimidazole and the ratio of end groups/dimethylsiloxy units had not changed compared with the starting value.

EXAMPLE 21

0.2 ml of a 1.0M solution of TBAF in THF was added to a mixture of 100 g of a polydimethylsiloxane having OH end groups and a viscosity of 1000 mm$^2$/s and 0.9 g of N-[(3-triethoxysilyl)-propyl]-4,5-dihydro-imidazole (commercially obtainable under the name "Dynasilan IMEO" from Hüls AG, Marl) and 7.6 g of vinyltriethoxysilane (0.0002 mole of F, 38 ppm of F, based on the weight of hydroxysiloxane). The end point of the reaction was determined by the crosslinking test described in Example 19. Since no further gelling on samples taken occurred after 20 minutes, deactivation was carried out after this time with 0.65 ml of a 10% strength solution of aluminum tri-sec-butylate in hexamethyldisiloxane (0.00026 mole of Al). It was found in the $^{29}$Si-NMR spectrum of the mixture that practically all the SiOH functions had been converted into Si—OSi(OCH$_2$CH$_3$)$_2$—CH=CH$_2$ and the ratio of end groups/dimethylsiloxy units had not changed compared with the starting value.

EXAMPLE 22

0.2 ml of a 1.0M solution of TBAF in THF was added to a mixture of 100 g of a polydimethylsiloxane having OH end groups and a viscosity of 1000 mm$^2$/s, 7.15 g of cyanoethyltriethoxysilane and 7.6 g of vinyltriethoxysilane (0.0002 mole of F, 38 ppm of F, based on the weight of hydroxysiloxane). The end point of the reaction was determined by the crosslinking test described in Example 19. Since no further gelling on samples taken occurred after 10 minutes, deactivation was carried out after this time with 0.65 ml of a 10% strength solution of aluminum tri-sec-butylate in hexamethyldisiloxane (0.00026 mole of Al). It was found in the $^{29}$Si-NMR spectrum of the mixture that 93.3% of all the SiOH functions had been converted into Si—OSi(OCH$_2$CH$_3$)$_2$—CH$_2$CH$_2$—CN and 7.7% of all the SiOH functions had been converted into Si—OSi(OCH$_2$CH$_3$)$_2$—CH=CH$_2$, and the ratio of end groups/dimethylsiloxy units had not changed compared with the starting value. The $^{29}$Si-NMR spectrum of a sample which had been subjected to storage under heat at 70° C. in a closed polyethylene bottle for 7 days showed no formation of monoethoxy end groups and/or branchings.

What is claimed is:

1. A process for the preparation of a storage stable, condensable, non-gelled organopolysiloxane which contains at least one unit of the formula:

$$(R^1O)_{3-m}R_mSiO_{1/2} \qquad (I)$$

in which

R is identical or different and is a hydrogen atom or monovalent, optionally substituted hydrocarbon radical, R$^1$ is identical or different and is a monovalent, optionally substituted hydrocarbon radical having 1 to 8 carbon atoms and m is 0, 1 or 2, said process comprising, in a 1st step, reacting an organosilicon compound (1) which contains at least one Si-bonded hydroxyl group with at least one silane (2) of the formula

$$(R^1O)_{4-m}SiR_m \qquad (II)$$

and/or a partial hydrolysate thereof, in which R, R$^1$ and m have the above mentioned meaning, in the presence of 0.1 to 1000 ppm by weight calculated as elemental fluorine and based on the weight of (1) of a fluoride salt (3), and optionally, in a 2nd step, when said reacting has ended, adding a component (4) which can bond fluoride ions wherein said fluoride salt is one having the formula:

$$(R_4^2N)F \qquad (III)$$

or an adduct of (III) with a carbonyl compound, wherein

R$^2$ is identical or different and is a hydrogen atom or a monovalent, optionally substituted hydrocarbon radical having 1 to 8 carbon atoms.

2. A process for the preparation of a storage stable, condensable, non-gelled organopolysiloxane which contains at least one unit of the formula:

$$(R^1O)_{3-m}R_mSiO_{1/2} \qquad (I)$$

in which

R is identical or different and is a hydrogen atom or monovalent, optionally substituted hydrocarbon radical, R$^1$ is identical or different and is a monovalent, optionally substituted hydrocarbon radical having 1 to 8 carbon atoms and m is 0, 1 or 2, which comprises, in a 1st step, reacting an organosilicon compound (1) which contains at least one Si-bonded hydroxyl group with at least one silane (2) of the formula

$$(R^1O)_{4-m}SiR_m \qquad (II)$$

and/or a partial hydrolysate thereof, in which R, R$^1$ and m have the above mentioned meaning, in the presence of 0.1 to 1000 ppm by weight calculated as elemental fluorine and based on the weight of (1) of a fluoride salt (3), and, in a 2nd step, when said reacting has ended, adding an aluminum compound or complex which can bond fluoride ions.

3. A process as claimed in claim 2 wherein said aluminum compound or complex comprises an aluminum alcoholate.

4. A process as claimed in claim 2, wherein said aluminum compound or complex is employed in an amount of 1.05 to 3 mol of aluminum per mol of fluoride of component (3).

* * * * *